(12) United States Patent
Omura et al.

(10) Patent No.: US 11,196,129 B2
(45) Date of Patent: Dec. 7, 2021

(54) CELL LAMINATE

(71) Applicant: Panasonic Intellectual Property Management Co., Ltd., Osaka (JP)

(72) Inventors: Tetsuji Omura, Hyogo (JP); Masaya Ugaji, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 21 days.

(21) Appl. No.: 16/638,603

(22) PCT Filed: Dec. 7, 2018

(86) PCT No.: PCT/JP2018/045029
§ 371 (c)(1),
(2) Date: Feb. 12, 2020

(87) PCT Pub. No.: WO2019/124108
PCT Pub. Date: Jun. 27, 2019

(65) Prior Publication Data
US 2020/0168883 A1 May 28, 2020

(30) Foreign Application Priority Data

Dec. 22, 2017 (JP) .............................. JP2017-246785

(51) Int. Cl.
*H01M 50/20* (2021.01)
*H01M 50/529* (2021.01)
*H01M 50/543* (2021.01)

(52) U.S. Cl.
CPC ......... *H01M 50/529* (2021.01); *H01M 50/20* (2021.01); *H01M 50/543* (2021.01)

(58) Field of Classification Search
CPC .. H01M 50/20; H01M 50/112; H01M 50/543; H01M 50/529
See application file for complete search history.

(56) References Cited

U.S. PATENT DOCUMENTS

| 2009/0075163 A1* | 3/2009 | Shevock | H01M 50/502 429/121 |
|---|---|---|---|
| 2011/0076521 A1 | 3/2011 | Shimizu et al. | |
| 2016/0248068 A1 | 8/2016 | Ha | |

FOREIGN PATENT DOCUMENTS

| JP | 2012-009319 | 1/2012 |
|---|---|---|
| JP | 2012-138239 | 7/2012 |

(Continued)

OTHER PUBLICATIONS

Machine Translation of: Otake et al. (JP 2012/138239A), Jul. 19, 2012.*

(Continued)

*Primary Examiner* — Kenneth J Douyette
(74) *Attorney, Agent, or Firm* — McDermott Will and Emery LLP

(57) ABSTRACT

A battery module includes a plurality of batteries stacked together, and a busbar. Each of the plurality of batteries includes a battery-side first structure and a battery-side second structure that regulate the connection of the battery and the busbar. The busbar has a busbar-side first structure and a busbar-side second structure that regulate the connection of the busbar and each of the batteries. If the battery-side first structures of the plurality of batteries are combined with the busbar-side first structure, and the battery-side second structures of the plurality of batteries are combined with the busbar-side second structure, each of the batteries is connected with the busbar. Alternatively, if the battery-side first structure of any one of the batteries is combined with the busbar-side second structure, the one of the batteries or another one of the batteries is not connected with the busbar.

6 Claims, 9 Drawing Sheets

(56) References Cited

FOREIGN PATENT DOCUMENTS

| JP | 2014-123433 | 7/2014 |
| JP | 2016-027578 | 2/2016 |
| JP | 2016-157670 | 9/2016 |

OTHER PUBLICATIONS

International Search Report of PCT application No. PCT/JP2018/045029 dated Mar. 5, 2019.

* cited by examiner

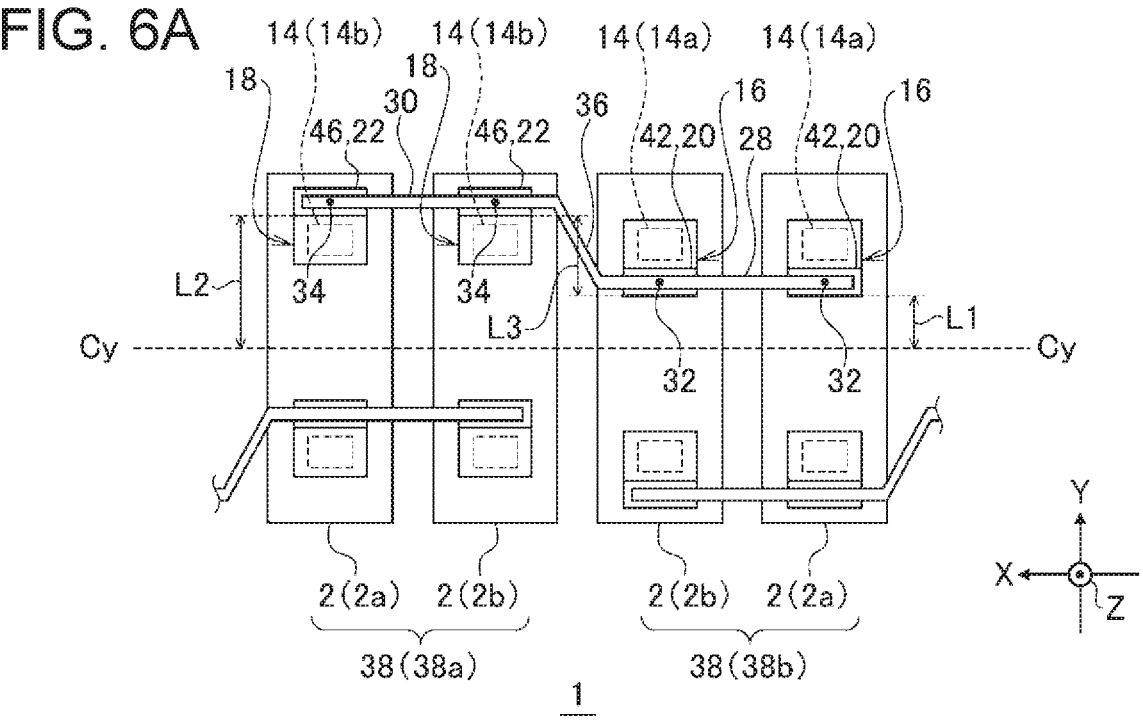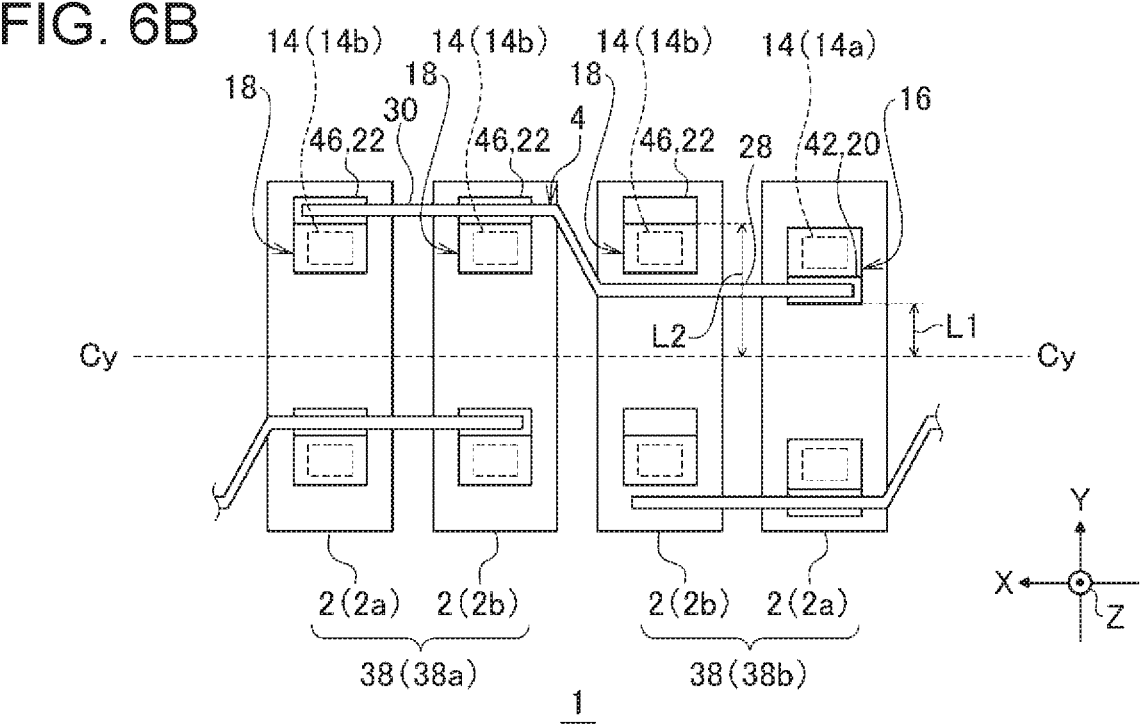

CELL LAMINATE

CROSS-REFERENCE TO RELATED APPLICATIONS

This application is a U.S. national stage application of the PCT International Application No. PCT/JP2018/045029 filed on Dec. 7, 2018, which claims the benefit of foreign priority of Japanese patent application 2017-246785 filed on Dec. 22, 2017, the contents all of which are incorporated herein by reference.

TECHNICAL FIELD

The present invention relates to a battery module.

BACKGROUND ART

A battery module is known as a battery used as a power source that needs to generate high voltage. The power source that needs to generate high voltage is used for a vehicle, for example. The battery module includes a plurality of batteries electrically connected with each other. In such a conventional battery module, terminals of batteries that are adjacent to each other are connected with each other by a busbar. For example, PTL 1 discloses a battery module. The battery module includes a plurality of batteries. Busbars connect the plurality of batteries with each other in parallel to form a plurality of battery units. The busbars connect the battery units with each other in series. Such a configuration reduces a number of components, such as voltage detection lines, and reduces cost of a battery device, compared with a case in which battery modules are connected with each other in parallel, and each of the battery modules includes batteries all of which are connected with each other in series by busbars.

CITATION LIST

Patent Literature

PTL 1: Unexamined Japanese Patent Publication No. 2016-27578

SUMMARY OF THE INVENTION

The inventors of the present invention have earnestly studied configurations that each connect batteries in parallel and series in a battery module. Consequently, the inventors of the present invention have recognized following problems. That is to say, when a plurality of batteries are being stacked together, orientations of some of the batteries may be wrong in such a manner that a position of a positive electrode and a position of a negative electrode of each of the batteries whose orientations are wrong are wrong. In that case, the moment the plurality of batteries are connected with each other with busbars, a short circuit occurs between each of the batteries whose orientations are wrong and one of the plurality of batteries connected with one of the batteries whose orientations are wrong.

The present invention is made in view of the above situation. It is an object of the present invention to provide a technique that does not allow a short circuit to occur between batteries in a battery module.

An aspect of the present invention is a battery module. The battery module includes: a plurality of batteries stacked together; and a busbar that electrically connects the plurality of batteries with each other. Each of the plurality of batteries includes a battery-side first structure and a battery-side second structure that regulate the connection of the battery and the busbar. The busbar has a busbar-side first structure and a busbar-side second structure that regulate the connection of the busbar to each of the batteries. In the case that the battery-side first structures of the plurality of batteries are combined with the busbar-side first structure, and that the battery-side second structures of the plurality of batteries are combined with the busbar-side second structure, each of the batteries is connected with the busbar. Alternatively, in the case that the battery-side first structure of any one of the batteries is combined with the busbar-side second structure, the one of the batteries or another one of the batteries is not connected with the busbar. Further, in the case that the battery-side second structure of any one of the batteries is combined with the busbar-side first structure, the one of the batteries or another one of the batteries is not connected with the busbar.

Any combination of the above components is also an effective aspect of the present invention. Further, the present invention is expressed in forms of methods, devices, and systems. The methods, devices, and systems are also effective aspects of the present invention.

The present invention does not allow a short circuit to occur between batteries in a battery module.

BRIEF DESCRIPTION OF DRAWINGS

FIG. 6A is a schematic plan view that illustrates part of the battery module. FIG. 6B is a schematic side view that illustrates an example in which an orientation of one of batteries that have been arranged is wrong.

DESCRIPTION OF EMBODIMENTS

Figure 1:
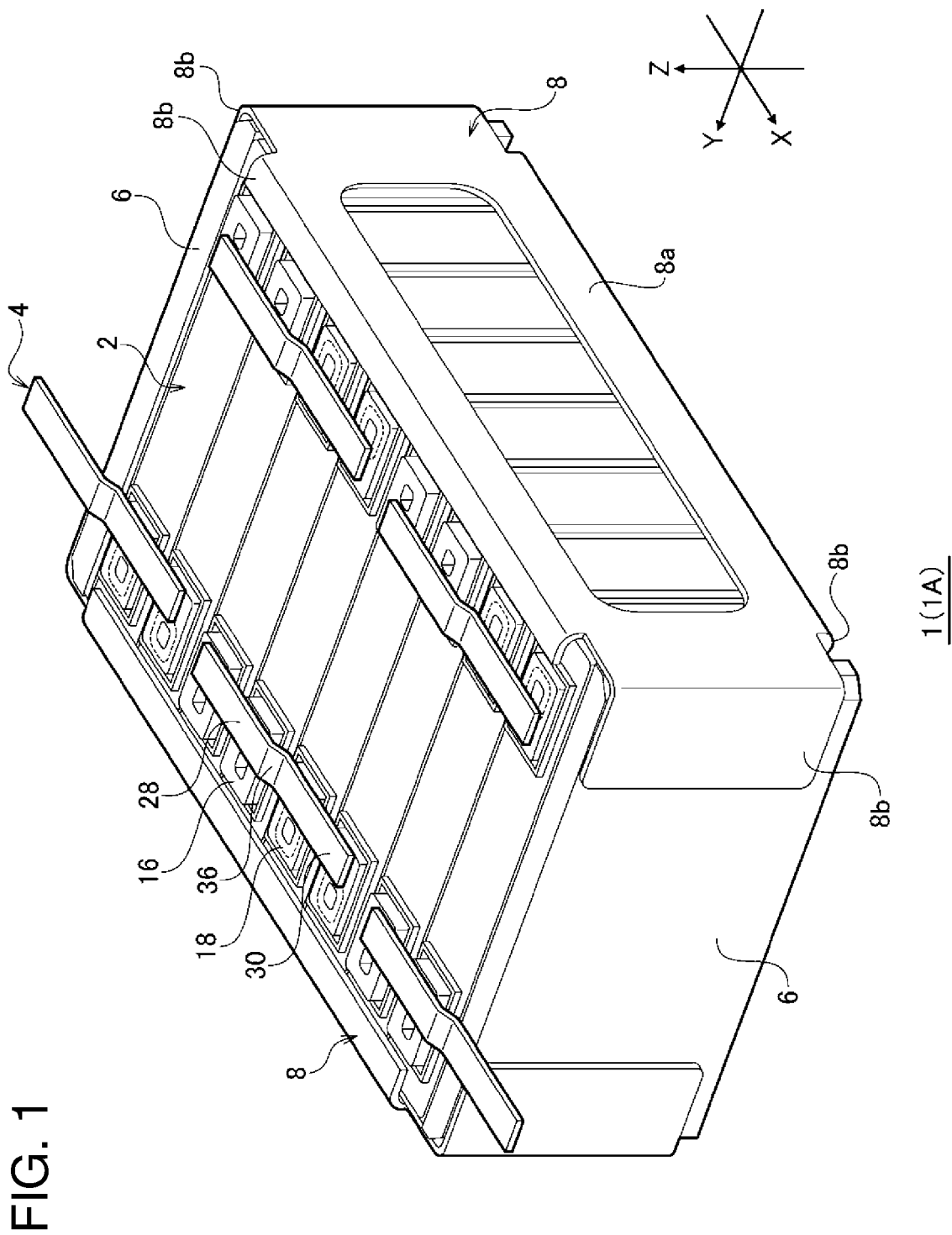
FIG. 1 is a schematic perspective view that illustrates a configuration of a battery module according to a first exemplary embodiment.

Hereinafter, the present invention will be described based on preferred exemplary embodiments with reference to the drawings. The exemplary embodiments are exemplifications and do not limit the invention. All features described in the exemplary embodiments and combinations of the features are not necessarily essential to the invention. The same reference marks are assigned to the same or equivalent components, members, and processes illustrated in the drawings. Explanation for the same or equivalent components, members, and processes will not be repeated as appropriate. For convenience, scales or shapes of portions illustrated in the drawings are determined to facilitate explanation of the portions. The scales or shapes of the portions should not be interpreted as limitation unless otherwise mentioned. Further, some components may be illustrated on slightly different scales in different drawings. Further, if terms "first", "second", and the like are used in the present description or claims, the terms "first", "second", and the like do not mean any order or importance, but are used to distinguish between one configuration and another configuration unless otherwise mentioned.

First Exemplary Embodiment

FIG. 1 is a schematic perspective view that illustrates a configuration of a battery module according to a first exemplary embodiment. Battery module (=battery stack) 1 (1A) includes a plurality of batteries 2 and a plurality of busbars 4.

Each of batteries 2 is a rechargeable secondary battery, such as a lithium-ion battery, a nickel-metal hydride battery, or a nickel-cadmium battery. Batteries 2 are what are called prismatic (=rectangular) batteries. The plurality of batteries 2 are stacked together at predetermined intervals. Main sides of batteries 2 that are adjacent to each other are in contact with each other. The terms "stacked together" mean that a plurality of components are arranged along any one axis. Therefore, stacking batteries 2 together may mean horizontally arranging the plurality of batteries 2. A configuration of batteries 2 will be described in detail later.

Each of busbars 4 is an elongated metallic component. Busbars 4 extend along axis X along which batteries 2 are stacked together (an axis indicated by arrow X in FIG. 1). Busbars 4 electrically connect the plurality of batteries 2 that have been stacked together with each other. Busbars 4 are made of a metal, such as copper or aluminum. For example, busbars 4 are welded to terminals of batteries 2. A configuration of busbars 4 will be described later. Further, it will be described later how busbars 4 connect batteries 2 with each other.

Battery module 1 includes a plurality of separators not illustrated. The separators are also referred to as insulating spacers. The separators are made of a resin that has an insulation property, for example. For example, the separators are made of a thermoplastic resin, such as polypropylene (PP), polybutylene terephthalate (PBT), a polycarbonate (PC), NORYL (registered trademark) resin (modified polyphenylene ether (PPE)). The separators are arranged between batteries 2, and are arranged between battery 2 and each of end plates 6, respectively. End plates 6 will be described later. Consequently, exterior cans of batteries 2 that are adjacent to each other are insulated from each other. Further, the exterior cans of batteries 2 are insulated from end plates 6.

Battery module 1 also includes the pair of end plates 6. End plates 6 are each made of a metal sheet, for example. The plurality of batteries 2 and the plurality of separators that have been stacked together are disposed between the pair of end plates 6. The pair of end plates 6 are each disposed along axis X along which batteries 2 are stacked together. The pair of end plates 6 are adjacent to outermost batteries 2, respectively. However, the separator is between each of the pair of end plates 6 and outermost battery 2.

Battery module 1 also includes a pair of binding components 8. The pair of binding components 8 bind batteries 2, the separators, and end plates 6 that have been stacked together. The pair of binding components 8 are also referred to as binding bars. The pair of binding components 8 are each disposed along horizontal axis Y (an axis indicated by arrow Y in FIG. 1) that is perpendicular to axis X along which the plurality of batteries 2 are stacked together. Along horizontal axis Y, terminals are arranged in each of batteries 2. Each of binding components 8 has flat portion 8a and bent portions 8b. Flat portion 8a is rectangular and is parallel to sides of batteries 2. Bent portions 8b protrude from ends of sides of flat portion 8a, respectively, toward batteries 2. For example, each of binding components 8 is a rectangular metal sheet whose sides are bent.

Two bent portions 8b that are opposite each other along axis X along which batteries 2 are stacked together are fixed to the pair of end plates 6, respectively, with screws, for example. Consequently, the pair of end plates 6 and the pair of binding components 8 bind the plurality of batteries 2 and the plurality of separators together. Binding components 8 bind the plurality of batteries 2 along axis X along which batteries 2 are stacked together. Consequently, binding components 8 position the plurality of batteries 2 along axis X along which batteries 2 are stacked together. Further, bottoms of the plurality of batteries 2 are in contact with lower bent portions 8b of binding components 8. However, separators are disposed between the bottoms of the plurality of batteries 2 and lower bent portions 8b of binding components 8. Tops of the plurality of batteries 2 are in contact with upper bent portions 8b of binding components 8. However, separators are disposed between the tops of the plurality of batteries 2 and upper bent portions 8b of binding components 8. Consequently, the plurality of batteries 2 are vertically positioned. Then busbars 4 are electrically connected with terminals of batteries 2. Consequently, battery module 1 is made.

Figure 2:
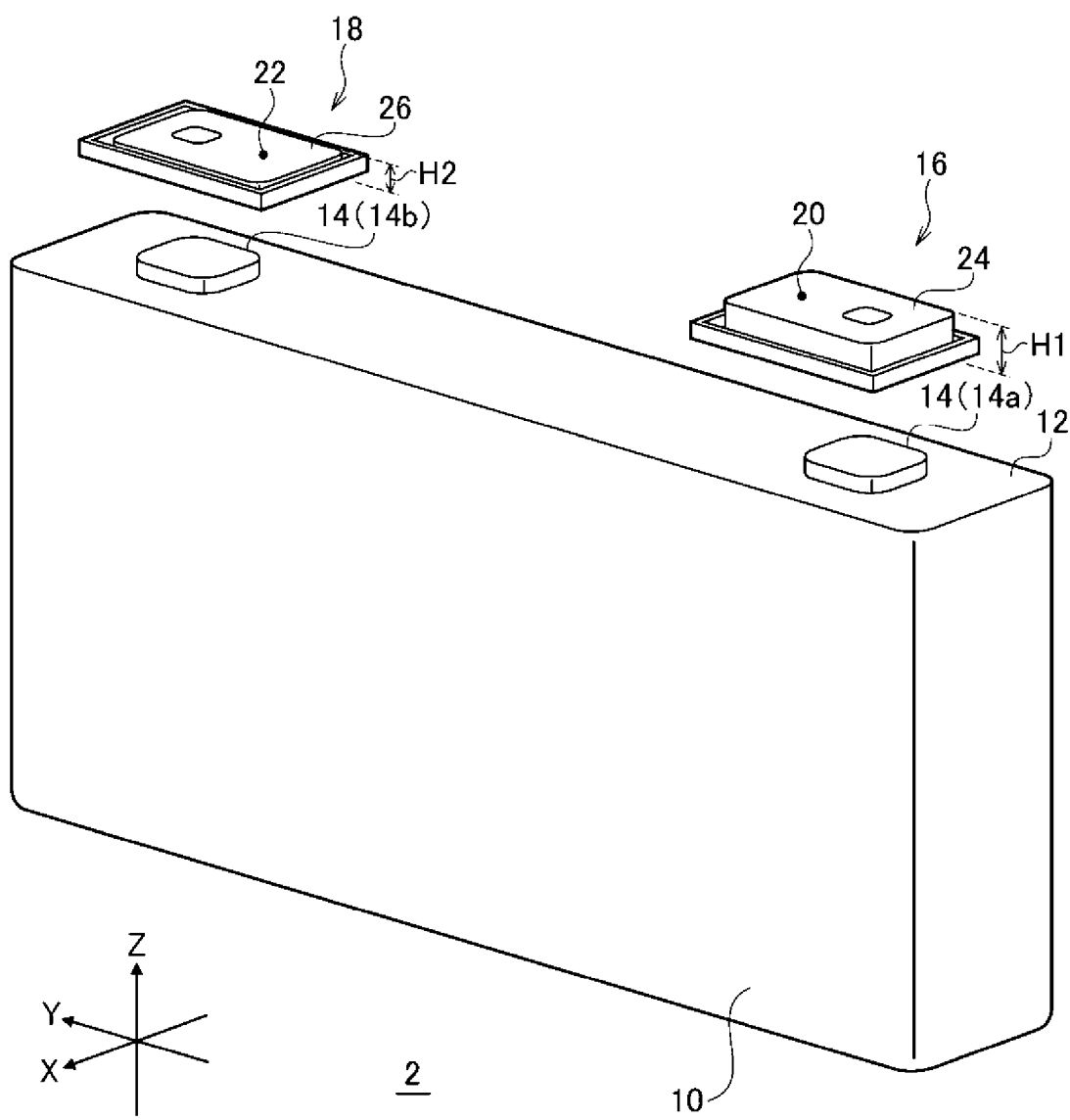
FIG. 2 is a schematic perspective view that illustrates a configuration of a battery.

Next, a configuration of batteries 2 and a configuration of busbars 4 will be described in detail. Further, it will be described in detail how busbars 4 electrically connect batteries 2 with each other. FIG. 2 is a schematic perspective view that illustrates a configuration of one of the batteries. A plurality of batteries 2 each include exterior can 10 that has a shape like a flat rectangular prism. One side of exterior can 10 has a substantially rectangular opening that is not illustrated. Electrodes and electrolyte are inserted into exterior can 10 through the opening. Sealing sheet 12 is attached to the opening of exterior can 10. Sealing sheet 12 seals the exterior can. First terminal 14a protrudes from one of two lengthways ends of sealing sheet 12. Second terminal 14b protrudes from the other lengthways end of sealing sheet 12. For example, first terminal 14a is a positive terminal, and second terminal 14b is a negative terminal. Hereinafter, first terminal 14a and second terminal 14b are collectively referred to as terminals 14 as appropriate, if first terminal 14a and second terminal 14b do not need to be distinguished.

Terminals 14 protrude from respective openings of sealing sheet 12. A gasket as a seal is disposed between a periphery of each of terminals 14 and the opening of sealing sheet 12. The gasket tightly fills a gap between sealing sheet 12 and terminal 14. Further, the gasket does not allow a short circuit between sealing sheet 12 and terminal 14. Exterior can 10, sealing sheet 12, and terminals 14 are electrical conductors, and are made of metal, for example. The gasket is an insulator and is made of resin, for example. Sealing sheet 12 includes a safety valve (not illustrated) between the pair of terminals 14. If a pressure rises to or above a predetermined value in the exterior can, the safety valve opens to release gas in the exterior can.

In the present exemplary embodiment, a top of battery 2 includes sealing sheet 12, and a bottom of battery 2 is opposite the top of battery 2. Further, battery 2 has two main sides that each connect the top of battery 2 with the bottom of battery 2. Of six sides of battery 2, the main sides each have the largest area. In addition to the top, the bottom, and the two main sides, battery 2 has two sides. The tops of batteries 2 constitute a top of battery module 1. The bottoms of batteries 2 constitute a bottom of battery module 1. The sides of batteries 2 constitute sides of battery module 1. For convenience, assume that the top of battery module 1 is a vertically upper side of battery module 1, and the bottom of battery module 1 is a vertically lower side of battery module 1.

Each of the plurality of batteries 2 includes battery-side first structure 16 and battery-side second structure 18. Battery-side first structure 16 and battery-side second structure 18 regulate the connection of battery 2 and busbar 4, that is, allow or do not allow battery 2 to be connected with busbar 4. Battery-side first structure 16, battery-side second structure 18, busbar-side first structure 28, and busbar-side second structure 30 cooperate with each other. Consequently, the connection of each of batteries 2 and busbar 4 is regulated. Busbar-side first structure 28 and busbar-side second structure 30 will be described later. In the present exemplary embodiment, first terminal 14a is in contact with busbar 4 at contact point 20 of first terminal 14a. Battery-side first structure 16 allows contact point 20 to have first height H1. Further, second terminal 14b is in contact with busbar 4 at contact point 22 of second terminal 14b. Battery-side second structure 18 allows contact point 22 to have second height H2.

More specifically, battery-side first structure 16 is first intermediate component 24 attached to first terminal 14a. First intermediate component 24 has a shape like a flat rectangular prism, and is conductive. One of two main sides of first intermediate component 24 has a depression that corresponds to first terminal 14a. First terminal 14a fits into the depression. Consequently, first intermediate component 24 is electrically connected with first terminal 14a. Busbar 4 is in contact with the other one of the two main sides of first intermediate component 24. Therefore, the other one of the two main sides of first intermediate component 24 has contact point 20 where first terminal 14a is in contact with busbar 4.

A thickness of first intermediate component 24 or a distance between the two main sides of first intermediate component 24 is equal to first height H1. Therefore, when first intermediate component 24 is attached to first terminal 14a, contact point 20 of first terminal 14a has first height H1 from sealing sheet 12.

Battery-side second structure 18 is second intermediate component 26 attached to second terminal 14b. Second intermediate component 26 has a shape like a flat rectangular prism, and is conductive. One of two main sides of second intermediate component 26 has a depression that corresponds to second terminal 14b. Second terminal 14b fits into the depression. Consequently, second intermediate component 26 is electrically connected with second terminal 14b. Busbar 4 is in contact with the other one of the two main sides of second intermediate component 26. Therefore, the other one of the two main sides of second intermediate component 26 has contact point 22 where second terminal 14b is in contact with busbar 4.

A thickness of second intermediate component 26 or a distance between the two main sides of second intermediate component 26 is equal to second height H2. Therefore, when second intermediate component 26 is attached to second terminal 14b, contact point 22 of second terminal 14b has second height 112 from sealing sheet 12. In the present exemplary embodiment, a thickness of second intermediate component 26 is smaller than a thickness of first intermediate component 24. Consequently, first height H1 is higher than second height H2.

First intermediate component 24 may be integral with first terminal 14a. Similarly, second intermediate component 26 may be integral with second terminal 14b. That is to say, first terminal 14a may be battery-side first structure 16, and second terminal 14b may be battery-side second structure 18. For convenience, in FIG. 2, contact point 20 is a point on a main side of battery-side first structure 16, and contact point 22 is a point on a main side of battery-side second structure 18. However, the whole main side of battery-side first structure 16 may be considered as contact point 20. Further, the whole main side of battery-side second structure 18 may be considered as contact point 22.

Figure 3A:
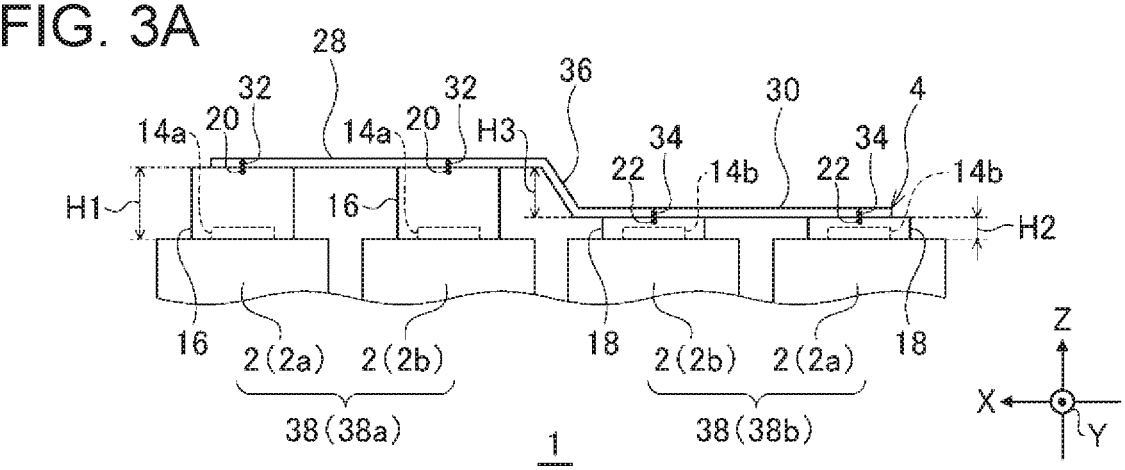
FIG. 3A is an enlarged schematic side view that illustrates one of busbars in the battery module.

FIG. 3A is an enlarged schematic side view that illustrates one of busbars in the battery module. Busbar 4 is elongated and extends along axis X along which batteries 2 are stacked together. Busbar 4 includes busbar-side first structure 28 and busbar-side second structure 30. Busbar-side first structure 28, busbar-side second structure 30, battery-side first structure 16, and battery-side second structure 18 cooperate with each other. Consequently, the connection of each of batteries 2 and busbar 4 is regulated. Busbar-side first structure 28 has contact points 32 where busbar 4 is in contact with first terminals 14a. Busbar-side second structure 30 has contact points 34 where busbar 4 is in contact with second terminals 14b. A height of busbar-side first structure 28 and a height of busbar-side second structure 30 are different from each other by difference H3 along an axis along which busbar 4 is disposed on batteries 2. Difference H3 is a difference between first height H1 and second height H2.

In the present exemplary embodiment, busbar 4 has step 36 at substantially a center of busbar 4. The center of busbar 4 is a center of busbar 4 along axis X along which batteries 2 are stacked together. Step 36 is between busbar-side first structure 28 and busbar-side second structure 30. Busbar-side first structure 28 of busbar 4 extends along axis X along which batteries 2 are stacked together. Further, step 36 of busbar 4 extends toward batteries 2. Busbar-side second structure 30 of busbar 4 extends along axis X along which batteries 2 are stacked together. A dimension of step 36 along an axis along which busbar 4 is disposed on batteries 2 or along vertical axis Z is equal to difference H3 between first height H1 and second height H2. Consequently, a difference between a height of one of two ends of busbar 4 and a height of the other end of busbar 4 is equal to difference H3.

The plurality of batteries 2 are divided into a plurality of battery units 38. Each of the plurality of battery units 38 includes at least two batteries 2. Busbars 4 connect batteries 2 of each of battery units 38 with each other in parallel. Further, busbars 4 connect battery units 38 with each other in series. In an example illustrated in FIG. 3A, first battery unit 38a includes first battery 2a and second battery 2b that are stacked together in such a manner that positive terminal 14 of first battery 2a is adjacent to positive terminal 14 of second battery 2b, and negative terminal 14 of first battery 2*a* is adjacent to negative terminal 14 of second battery 2*b*. Similarly, second battery unit 38*b* includes first battery 2*a* and second battery 2*b* that are stacked together in such a manner that positive terminal 14 of first battery 2*a* is adjacent to positive terminal 14 of second battery 2*b*, and negative terminal 14 of first battery 2*a* is adjacent to negative terminal 14 of second battery 2*b*.

First battery unit 38*a* and second battery unit 38*b* are stacked together in such a manner that first terminal 14*a* of first battery unit 38*a* is adjacent to second terminal 14*b* of second battery unit 38*b*. Then busbar 4 is joined to battery-side first structures 16 attached to first terminals 14*a*, and is joined to battery-side second structures 18 attached to second terminals 14*b*. Consequently, contact points 32 of busbar 4 are electrically connected with contact points 20 of first terminals 14*a*, respectively. Further, contact points 34 of busbar 4 are electrically connected with contact points 22 of second terminals 14*b*, respectively. Consequently, busbar 4 connects first battery 2*a* and second battery 2*b* of each of battery units 38 with each other in parallel. Further, busbar 4 connects first battery unit 38*a* with second battery unit 38*b* in series.

In an example in FIG. 3A, all batteries 2 that correspond to one busbar 4 are stacked together in such a manner that orientations of first terminals 14*a* and orientations of second terminals 14*b* are correct. In that case, battery-side first structures 16 of two batteries 2 are combined with busbar-side first structure 28. Further, battery-side second structures 18 of the other two batteries 2 are combined with busbar-side second structure 30.

That is to say, battery-side first structures 16 of batteries 2 of first battery unit 38*a* come into contact with busbar-side first structure 28. Further, battery-side second structures 18 of batteries 2 of second battery unit 38*b* come into contact with busbar-side second structure 30. Step 36 of busbar 4 absorbs difference H3 between first height H1 of battery-side first structures 16 and second height H2 of battery-side second structures 18. Consequently, battery-side first structures 16 and battery-side second structures 18 simultaneously come into contact with busbar 4. Consequently, batteries 2 and busbar 4 are electrically connected with each other.

Figure 3B:
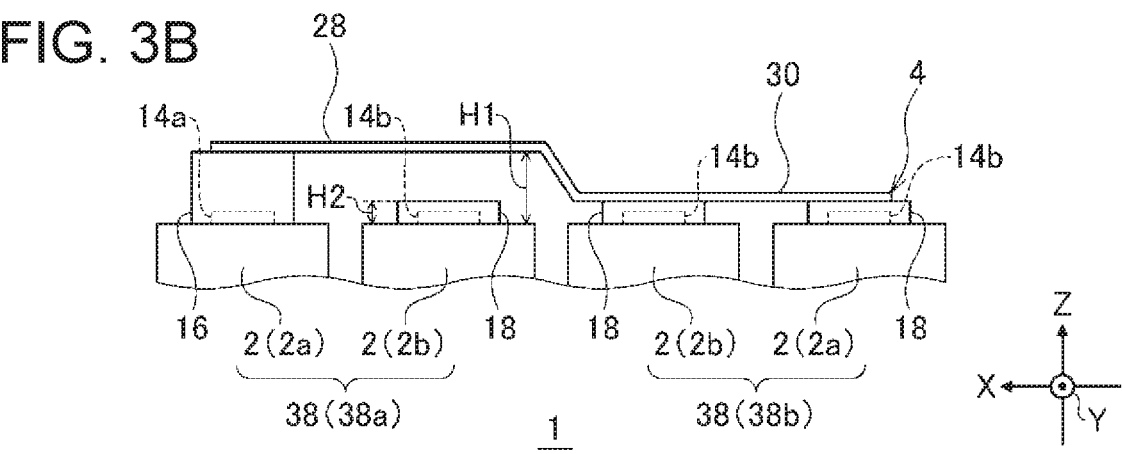
FIG. 3B is a schematic side view that illustrates an example in which an orientation of one of batteries that have been arranged is wrong.
Figure 3C:
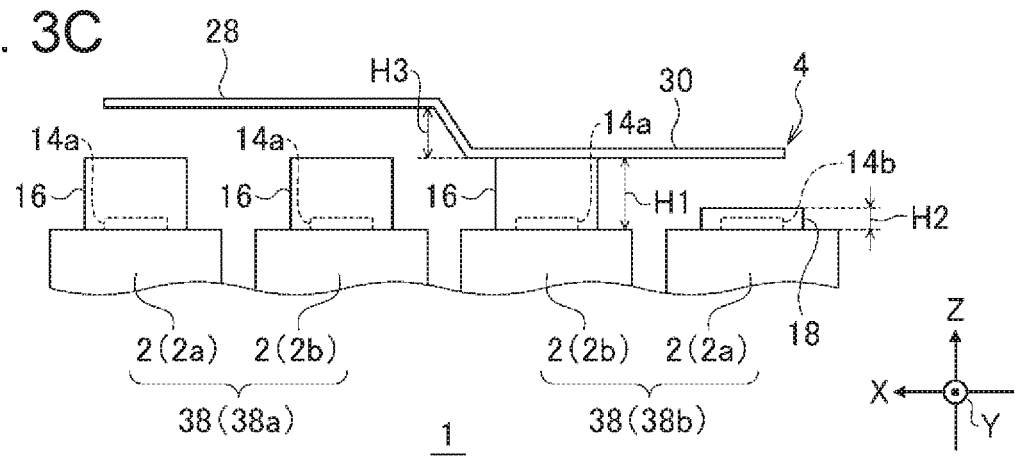
FIG. 3C is a schematic side view that illustrates another example in which an orientation of one of batteries that have been arranged is wrong.

On the other hand, if battery-side first structure 16 of any one of batteries 2 is combined with busbar-side second structure 30, or if battery-side second structure 18 of any one of batteries 2 is combined with busbar-side first structure 28, battery 2 in question or the other batteries 2 are not connected with busbar 4. FIG. 3B is a schematic side view that illustrates an example in which an orientation of one of batteries that have been arranged is wrong. FIG. 3C is a schematic side view that illustrates another example in which an orientation of one of batteries that have been arranged is wrong.

For example, an orientation of second battery 2*b* of first battery unit 38*a* is wrong, as illustrated in FIG. 3B. First terminal 14*a* and second terminal 14*b* of second battery 2*b* are at wrong positions. Orientations of other batteries 2 are correct. In that case, battery-side second structure 18 of second battery 2*b* of first battery unit 38*a* is combined with busbar-side first structure 28. Battery-side first structure 16 of first battery 2*a* of first battery unit 38*a* is combined with busbar-side first structure 28. Battery-side second structures 18 of batteries 2 of second battery unit 38*b* are combined with busbar-side second structure 30.

Battery-side first structure 16 of first battery 2*a* of first battery unit 38*a* is in contact with busbar-side first structure 28. Battery-side second structures 18 of batteries 2 of second battery unit 38*b* are in contact with busbar-side second structure 30. Busbar-side first structure 28 in the state extends at first height H1. Battery-side second structure 18 of second battery 2*b* of first battery unit 38*a* has second height H2. Battery-side second structure 18 of second battery 2*b* of first battery unit 38*a* is opposite busbar-side first structure 28. A gap is between battery-side second structure 18 and busbar-side first structure 28. Therefore, battery-side second structure 18 is not in contact with busbar-side first structure 28. Consequently, second battery 2*b* of first battery unit 38*a* is not connected with busbar 4 since orientations of terminals 14 of second battery 2*b* of first battery unit 38*a* are wrong.

For example, an orientation of second battery 2*b* of second battery unit 38*b* is wrong, as illustrated in FIG. 3C. First terminal 14*a* and second terminal 14*b* of second battery 2*b* are at wrong positions. Orientations of other batteries 2 are correct. In that case, battery-side first structure 16 of second battery 2*b* of second battery unit 38*b* is combined with busbar-side second structure 30. Battery-side first structures 16 of batteries 2 of first battery unit 38*a* are combined with busbar-side first structure 28. Battery-side second structure 18 of first battery 2*a* of second battery unit 38*b* is combined with busbar-side second structure 30.

Battery-side first structure 16 of second battery 2*b* of second battery unit 38*b* is in contact with busbar-side second structure 30. Busbar-side second structure 30 in the state extends at first height H1. Step 36 increases a height of busbar-side first structure 28 by difference H3. Consequently, busbar-side first structure 28 extends at a height that is a sum of first height H1 and difference H3.

Battery-side first structures 16 of batteries 2 of first battery unit 38*a* have first height H1. Battery-side first structures 16 of batteries 2 of first battery unit 38*a* are opposite busbar-side first structure 28. Battery-side second structure 18 of first battery 2*a* of second battery unit 38*b* has second height H2. Battery-side second structure 18 of first battery 2*a* of second battery unit 38*b* is opposite busbar-side second structure 30. A gap is between battery-side first structure 16 of each of batteries 2 of first battery unit 38*a* and busbar-side first structure 28. Therefore, battery-side first structure 16 of each of batteries 2 of first battery unit 38*a* is not in contact with busbar-side first structure 28. Further, a gap is between battery-side second structure 18 of first battery 2*a* of second battery unit 38*b* and busbar-side second structure 30. Therefore, battery-side second structure 18 of first battery 2*a* of second battery unit 38*b* is not in contact with busbar-side second structure 30. Consequently, only second battery 2*b* of second battery unit 38*b* is connected with busbar 4, and the other batteries 2 are not connected with busbar 4 since orientations of terminals 14 of second battery 2*b* of second battery unit 38*b* are wrong.

As described above, battery module 1 according to the present exemplary embodiment includes the plurality of batteries 2 stacked together, and busbars 4 that electrically connect the plurality of batteries 2 with each other. The plurality of batteries 2 are divided into a plurality of battery units 38. Each of battery units 38 includes at least two of the plurality of batteries 2. Busbars 4 connect the at least two of the plurality of batteries 2 of each of battery units 38 with each other in parallel. Busbars 4 connect battery units 38 with each other in series. Each of the plurality of batteries 2 includes battery-side first structure 16 and battery-side second structure 18 that regulate electrical connection of battery 2 and busbars 4. Each of busbars 4 has busbar-side first structure 28 and busbar-side second structure 30 that regulate electrical connection of busbar 4 to each of batteries 2.

If battery-side first structures 16 of a plurality of batteries 2 are combined with busbar-side first structure 28 of busbar 4, and battery-side second structures 18 of the plurality of batteries 2 are combined with busbar-side second structure 30 of busbar 4, each of batteries 2 is electrically connected with busbar 4. On the other hand, if battery-side first structure 16 of any one of batteries 2 is combined with busbar-side second structure 30 of busbar 4, or if battery-side second structure 18 of any one of batteries 2 is combined with busbar-side first structure 28 of busbar 4, battery 2 in question or the other batteries 2 are not electrically connected with busbar 4.

Each of the plurality of batteries 2 includes first terminal 14a and second terminal 14b. First terminal 14a is in contact with busbar 4 at contact point 20 of first terminal 14a. Battery-side first structure 16 allows contact point 20 to have first height H1. Second terminal 14b is in contact with busbar 4 at contact point 22 of second terminal 14b. Battery-side second structure 18 allows contact point 22 to have second height H2. Busbar-side first structure 28 has contact points 32 where busbar 4 is in contact with first terminals 14a. Busbar-side second structure 30 has contact points 34 where busbar 4 is in contact with second terminals 14b. A height of busbar-side first structure 28 and a height of busbar-side second structure 30 are different from each other by difference H3 along an axis along which busbar 4 is disposed on batteries 2. Difference H3 is a difference between first height H1 and second height H2. That is to say, in the present exemplary embodiment, a height of first terminals 14a is different from a height of second terminals 14b. Therefore, the connection of each of batteries 2 and busbar 4 is regulated.

When a plurality of batteries 2 are being stacked together, orientations of some of batteries 2 may be wrong in such a manner that a position of a positive electrode and a position of a negative electrode of each of batteries 2 whose orientations are wrong are wrong. In that case, the above configuration does not allow busbar 4 to electrically connect each of batteries 2 whose orientations are wrong with another one of the plurality of batteries 2. Consequently, a short circuit is not allowed to occur between batteries 2 in battery module 1. Further, the configuration does not allow batteries 2 to be wrongly arranged.

Second Exemplary Embodiment

A battery module according to a second exemplary embodiment and the battery module according to the first exemplary embodiment have a same configuration except for differences in configuration between respective battery-side first structures 16, battery-side second structures 18, busbar-side first structures 28, and busbar-side second structures 30. Hereinafter, a difference in configuration between the battery module according to the present exemplary embodiment and the battery module according to the first exemplary embodiment will be mainly described. A same configuration will be simply described, or will not be described.

Figure 4:
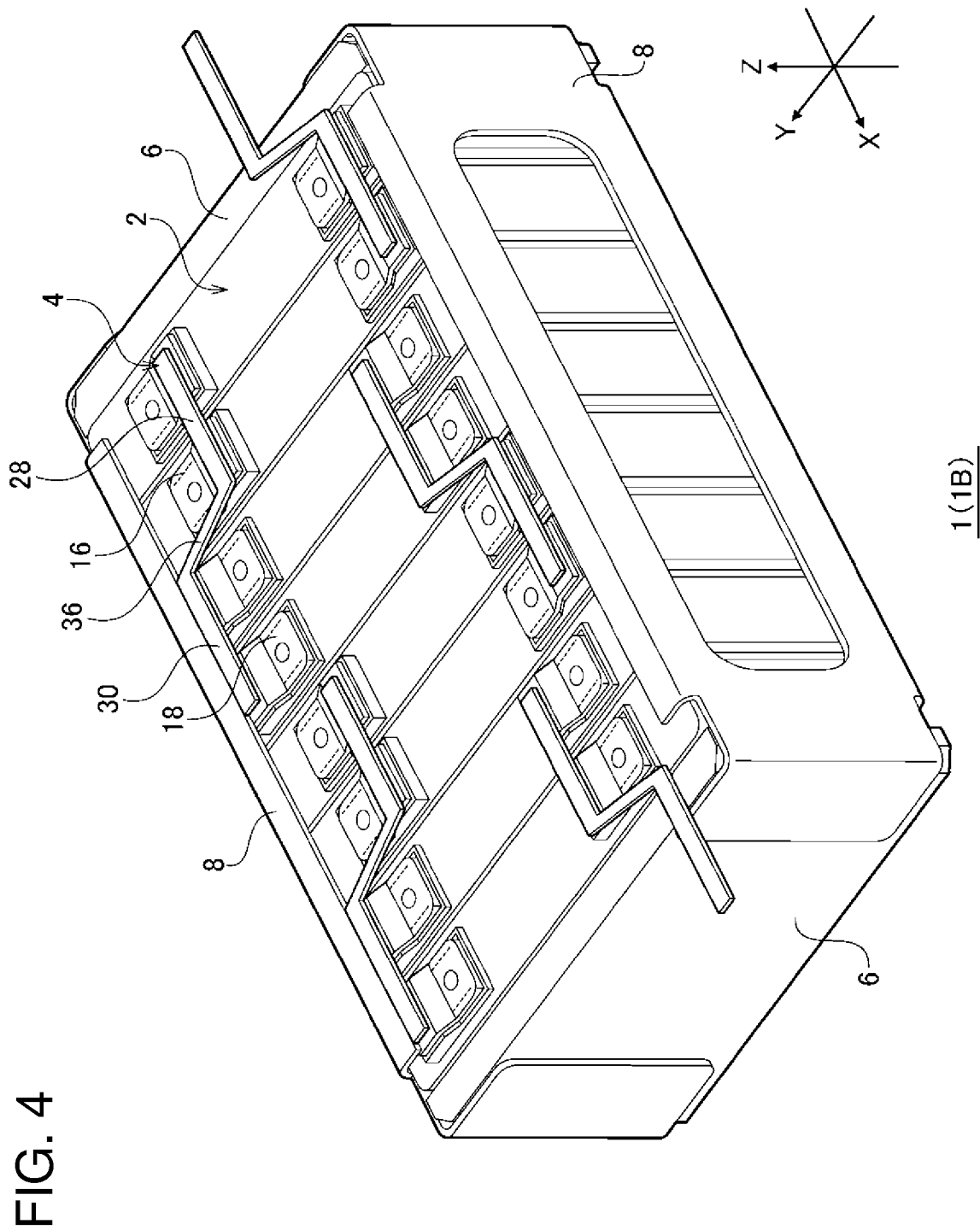
FIG. 4 is a schematic perspective view that illustrates a configuration of a battery module according to a second exemplary embodiment.

FIG. 4 is a schematic perspective view that illustrates a configuration of a battery module according to the second exemplary embodiment. Battery module 1 (1B) includes a plurality of batteries 2 and a plurality of busbars 4. The plurality of batteries 2 are stacked together at predetermined intervals. Main sides of batteries 2 that are adjacent to each other are in contact with each other. Busbars 4 electrically connect the plurality of batteries 2 that have been stacked together with each other.

Battery module 1 includes a plurality of separators not illustrated. The separators are arranged between batteries 2, and are arranged between battery 2 and each of end plates 6, respectively. Battery module 1 also includes the pair of end plates 6. The pair of end plates 6 are each disposed along axis X along which batteries 2 are stacked together. The pair of end plates 6 are adjacent to outermost batteries 2, respectively. However, the separator is between each of the pair of end plates 6 and outermost battery 2. Battery module 1 also includes a pair of binding components 8. The pair of binding components 8 bind batteries 2, the separators, and end plates 6 that have been stacked together.

Figure 5:
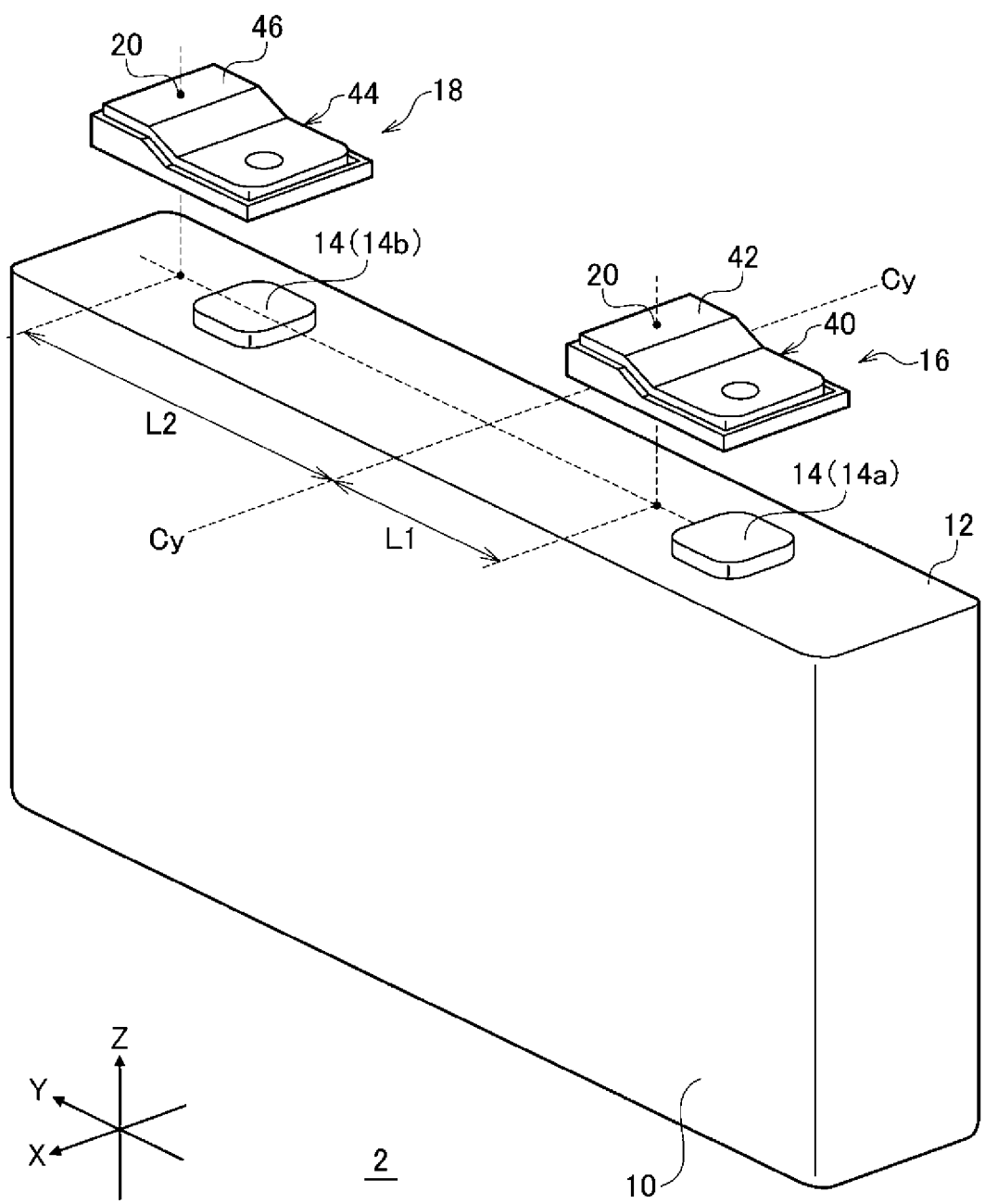
FIG. 5 is a schematic perspective view that illustrates a configuration of one of batteries.

Next, a configuration of batteries 2 and a configuration of busbars 4 will be described in detail. Further, it will be described in detail how busbars 4 electrically connect batteries 2 with each other. FIG. 5 is a schematic perspective view that illustrates a configuration of one of the batteries. A plurality of batteries 2 each include exterior can 10. One side of exterior can 10 has an opening. Sealing sheet 12 is attached to the opening. First terminal 14a protrudes from one of two lengthways ends of sealing sheet 12. Second terminal 14b protrudes from the other lengthways end of sealing sheet 12. Terminals 14 protrude from respective openings of sealing sheet 12.

Each of the plurality of batteries 2 includes battery-side first structure 16 and battery-side second structure 18 that regulate the connection of battery 2 and busbars 4. Battery-side first structure 16, battery-side second structure 18, busbar-side first structure 28, and busbar-side second structure 30 cooperate with each other. Consequently, the connection of each of batteries 2 and busbar 4 is regulated.

In the present exemplary embodiment, first terminal 14a is in contact with busbar 4 at contact point 20 of first terminal 14a. Battery-side first structure 16 allows a distance from center Cy of battery 2 to contact point 20 to be first distance L1. The distance from center Cy of battery 2 to contact point 20 is along an axis along which first terminal 14a and second terminal 14b are arranged. Further, second terminal 14b is in contact with busbar 4 at contact point 22 of second terminal 14b. Battery-side second structure 18 allows a distance from center Cy of battery 2 to contact point 22 to be second distance L2. The distance from center Cy of battery 2 to contact point 22 is along an axis along which two terminals 14 are arranged. Distances from center Cy of battery 2 to each of two terminals 14 are equal along an axis along which first terminal 14a and second terminal 14b are arranged. In other words, the distances from center Cy of battery 2 to each of two terminals 14 are equal along horizontal axis Y.

More specifically, battery-side first structure 16 is third intermediate component 40 attached to first terminal 14a. Third intermediate component 40 has a shape like a flat rectangular prism, and is conductive. One of two main sides of third intermediate component 40 has a depression that corresponds to first terminal 14a. First terminal 14a fits into the depression. Consequently, third intermediate component 40 is electrically connected with first terminal 14a. Third intermediate component 40 has first busbar placement surface 42. First busbar placement surface 42 is part of the other one of the two main sides of third intermediate component 40. First busbar placement surface 42 is higher than the other part of the other one of the two main sides. Busbar 4 is in contact with first busbar placement surface 42. Therefore, first busbar placement surface 42 has contact point 20 where first terminal 14a is in contact with busbar 4.

First busbar placement surface 42 is closer to center Cy of battery 2 than first terminal 14a is. Therefore, when third intermediate component 40 is attached to first terminal 14a, contact point 20 of first terminal 14a is closer to center Cy of battery 2 than first terminal 14a is.

Battery-side second structure 18 is fourth intermediate component 44 attached to second terminal 14b. Fourth intermediate component 44 has a shape like a flat rectangular prism, and is conductive. One of two main sides of fourth intermediate component 44 has a depression that corresponds to second terminal 14b. Second terminal 14b fits into the depression. Consequently, fourth intermediate component 44 is electrically connected with second terminal 14b. Fourth intermediate component 44 has second busbar placement surface 46. Second busbar placement surface 46 is part of the other one of the two main sides of fourth intermediate component 44. Second busbar placement surface 46 is higher than the other part of the other one of the two main sides. Busbar 4 is in contact with second busbar placement surface 46. Therefore, second busbar placement surface 46 has contact point 22 where second terminal 14b is in contact with busbar 4.

Second busbar placement surface 46 is more apart from center Cy of battery 2 than second terminal 14b is. Therefore, when fourth intermediate component 44 is attached to second terminal 14b, contact point 22 of second terminal 14b is more apart from center Cy of battery 2 than second terminal 14b is. In the present exemplary embodiment, contact point 20 of first terminal 14a is closer to center Cy of battery 2 than first terminal 14a is. Further, contact point 22 of second terminal 14b is more apart from center Cy of battery 2 than second terminal 14b is. Therefore, first distance L1 from center Cy to contact point 20 is different from second distance L2 from center Cy to contact point 22. First distance L1 is shorter than second distance L2.

Third intermediate component 40 may be integral with first terminal 14a. Similarly, fourth intermediate component 44 may be integral with second terminal 14b. That is to say, first terminal 14a may be battery-side first structure 16, and second terminal 14b may be battery-side second structure 18. For convenience, in FIG. 5, contact point 20 is at a center of first busbar placement surface 42, and contact point 22 is at a center of second busbar placement surface 46. However, whole first busbar placement surface 42 may be considered as contact point 20. Further, whole second busbar placement surface 46 may be considered as contact point 22.

FIG. 6A is a schematic plan view that illustrates part of the battery module. Each of busbars 4 is elongated and extends along axis X along which batteries 2 are stacked together. Busbar 4 includes busbar-side first structure 28 and busbar-side second structure 30. Busbar-side first structure 28, busbar-side second structure 30, battery-side first structure 16, and battery-side second structure 18 cooperate with each other. Consequently, the connection of each of batteries 2 and busbar 4 is regulated. Busbar-side first structure 28 has contact points 32 where busbar 4 is in contact with first terminals 14a. Busbar-side second structure 30 has contact points 34 where busbar 4 is in contact with second terminals 14b. A position of busbar-side first structure 28 and a position of busbar-side second structure 30 are apart from each other by difference L3 along an axis along which first terminal 14a and second terminal 14b are arranged. Difference L3 is a difference between first distance L1 and second distance L2.

In the present exemplary embodiment, busbar 4 has step 36 at substantially a center of busbar 4. The center of busbar 4 is a center of busbar 4 along axis X along which batteries 2 are stacked together. Step 36 is between busbar-side first structure 28 and busbar-side second structure 30. Busbar-side first structure 28 of busbar 4 extends along axis X along which batteries 2 are stacked together. Further, step 36 of busbar 4 extends toward center Cy of battery 2. Busbar-side second structure 30 of busbar 4 extends along axis X along which batteries 2 are stacked together. A dimension of step 36 along an axis along which first terminal 14a and second terminal 14b are arranged is equal to difference L3 between first distance L1 and second distance L2. In other words, a dimension of step 36 along horizontal axis Y is equal to difference L3 between first distance L1 and second distance L2. Consequently, a difference between a position of one of two ends of busbar 4 and a position of the other end of busbar 4 is equal to difference L3. Difference L3 is larger than a width of busbar 4. Therefore, when busbar-side first structure 28 and busbar-side second structure 30 are seen along axis X along which batteries 2 are stacked together, busbar-side first structure 28 does not overlap busbar-side second structure 30.

The plurality of batteries 2 are divided into a plurality of battery units 38. Each of the plurality of battery units 38 includes at least two batteries 2. Busbars 4 connect batteries 2 of each of battery units 38 with each other in parallel. Further, busbars 4 connect battery units 38 with each other in series. In an example illustrated in FIG. 6A, first battery unit 38a includes first battery 2a and second battery 2b that are stacked together in such a manner that positive terminal 14 of first battery 2a is adjacent to positive terminal 14 of second battery 2b, and negative terminal 14 of first battery 2a is adjacent to negative terminal 14 of second battery 2b. Similarly, second battery unit 38b includes first battery 2a and second battery 2b that are stacked together in such a manner that positive terminal 14 of first battery 2a is adjacent to positive terminal 14 of second battery 2b, and negative terminal 14 of first battery 2a is adjacent to negative terminal 14 of second battery 2b.

First battery unit 38a and second battery unit 38b are stacked together in such a manner that first terminal 14a of first battery unit 38a is adjacent to second terminal 14b of second battery unit 38b. Then busbar 4 is joined to battery-side first structures 16 attached to first terminals 14a, and battery-side second structures 18 attached to second terminals 14b. Consequently, contact points 32 of busbar 4 are electrically connected with contact points 20 of first terminals 14a, respectively. Further, contact points 34 of busbar 4 are electrically connected with contact points 22 of second terminals 14b, respectively. Consequently, busbar 4 connects first battery 2a and second battery 2b of each of battery units 38 with each other in parallel. Further, busbar 4 connects first battery unit 38a with second battery unit 38b in series.

In an example in FIG. 6A, all batteries 2 that correspond to one busbar 4 are stacked together in such a manner that orientations of first terminals 14a and orientations of second terminals 14b are correct. In that case, battery-side first structures 16 of two batteries 2 are combined with busbar-side first structure 28. Further, battery-side second structures 18 of the other two batteries 2 are combined with busbar-side second structure 30.

That is to say, busbar-side first structure 28 comes into contact with first busbar placement surfaces 42 of batteries 2 of first battery unit 38a. Further, busbar-side second structure 30 comes into contact with second busbar placement surfaces 46 of batteries 2 of second battery unit 38b. Step 36 of busbar 4 absorbs difference L3 between first distance L1 and second distance L2. First distance L1 is from center Cy of battery 2 to first busbar placement surface 42 (or contact point 20). Second distance L2 is from center Cy of battery 2 to second busbar placement surface 46 (or contact point 22). Consequently, battery-side first structures 16 and battery-side second structures 18 simultaneously come into contact with busbar 4. Consequently, batteries 2 and busbar 4 are electrically connected with each other.

On the other hand, if battery-side first structure 16 of any one of batteries 2 is combined with busbar-side second structure 30, or if battery-side second structure 18 of any one of batteries 2 is combined with busbar-side first structure 28, battery 2 in question or the other batteries 2 are not connected with busbar 4. FIG. 6B is a schematic side view that illustrates an example in which an orientation of one of batteries that have been arranged is wrong.

For example, an orientation of second battery 2b of second battery unit 38b is wrong, as illustrated in FIG. 6B. First terminal 14a and second terminal 14b of second battery 2b are at wrong positions. Orientations of other batteries 2 are correct. In that case, battery-side second structure 18 of second battery 2b of second battery unit 38b is combined with busbar-side first structure 28. Battery-side second structures 18 of batteries 2 of first battery unit 38a are combined with busbar-side second structure 30. Battery-side first structure 16 of first battery 2a of second battery unit 38b is combined with busbar-side first structure 28.

Second busbar placement surfaces 46 of batteries 2 of first battery unit 38a are in contact with busbar-side second structure 30. First busbar placement surface 42 of first battery 2a of second battery unit 38b is in contact with busbar-side first structure 28. Busbar-side first structure 28 in the state is apart from center Cy of battery 2 by approximately first distance L1. Battery-side second structure 18 of second battery 2b of second battery unit 38b is combined with busbar-side first structure 28. A distance from center Cy of battery 2 to second busbar placement surface 46 of battery-side second structure 18 is second distance L2. Therefore, second busbar placement surface 46 is not in contact with busbar-side first structure 28. Consequently, second battery 2b of second battery unit 38b is not connected with busbar 4 since orientations of terminals 14 of second battery 2b of second battery unit 38b are wrong.

Further, assume that busbar-side first structure 28 is disposed on second busbar placement surface 46 of battery-side second structure 18 to electrically connect busbar 4 with second battery 2b whose orientation is wrong. In that case, batteries 2 of first battery unit 38a and first battery 2a of second battery unit 38b are not connected with busbar 4.

As described above, in battery module 1 according to the present exemplary embodiment, first terminal 14a is in contact with busbar 4 at contact point 20 of first terminal 14a. Battery-side first structure 16 allows a distance from center Cy of battery 2 to contact point 20 to be first distance L1. Further, second terminal 14b is in contact with busbar 4 at contact point 22 of second terminal 14b. Battery-side second structure 18 allows a distance from center Cy of battery 2 to contact point 22 to be second distance L2. A position of busbar-side first structure 28 and a position of busbar-side second structure 30 are apart from each other by difference L3. Difference L3 is a difference between first distance L1 and second distance L2.

Battery 2 and busbar 4 are fixed at respective positions. Consequently, second busbar placement surface 46 of battery-side second structure 18 of battery 2 is in contact with busbar-side second structure 30 of busbar 4. If an orientation of battery 2 in the state is changed, difference L3 does not allow first busbar placement surface 42 of battery-side first structure 16 of battery 2 to be in contact with busbar-side second structure 30 of busbar 4. Alternatively, battery 2 and busbar 4 are fixed at respective positions. Consequently, first busbar placement surface 42 of battery-side first structure 16 of battery 2 is in contact with busbar-side first structure 28 of busbar 4. If an orientation of battery 2 in the state is changed, difference L3 does not allow second busbar placement surface 46 of battery-side second structure 18 of battery 2 to be in contact with busbar-side first structure 28 of busbar 4.

That is to say, if a straight line that passes through center Cy of battery 2 and is parallel to axis X along which batteries 2 are stacked together is used as an axis of line symmetry, positions of contact points 20, 22 of terminals 14 do not have line symmetry. A position of busbar-side first structure 28 of busbar 4 and a position of busbar-side second structure 30 of busbar 4 are apart from each other by a difference between a distance from contact point 22 to center Cy and a distance from contact point 20 to center Cy. A distance from center Cy of battery 2 to contact point 20 of terminal 14 is different from a distance from center Cy of battery 2 to contact point 22 of terminal 14, as described above. Therefore, a short circuit is not allowed to occur between batteries 2 in battery module 1. Further, batteries 2 are not allowed to be wrongly arranged.

Third Exemplary Embodiment

A battery module according to a third exemplary embodiment and the battery module according to the first exemplary embodiment have a same configuration except for differences in configuration between respective battery-side first structures 16, battery-side second structures 18, busbar-side first structures 28, and busbar-side second structures 30. Hereinafter, a difference in configuration between the battery module according to the present exemplary embodiment and the battery module according to the first exemplary embodiment will be mainly described. A same configuration will be simply described, or will not be described.

Figure 7:
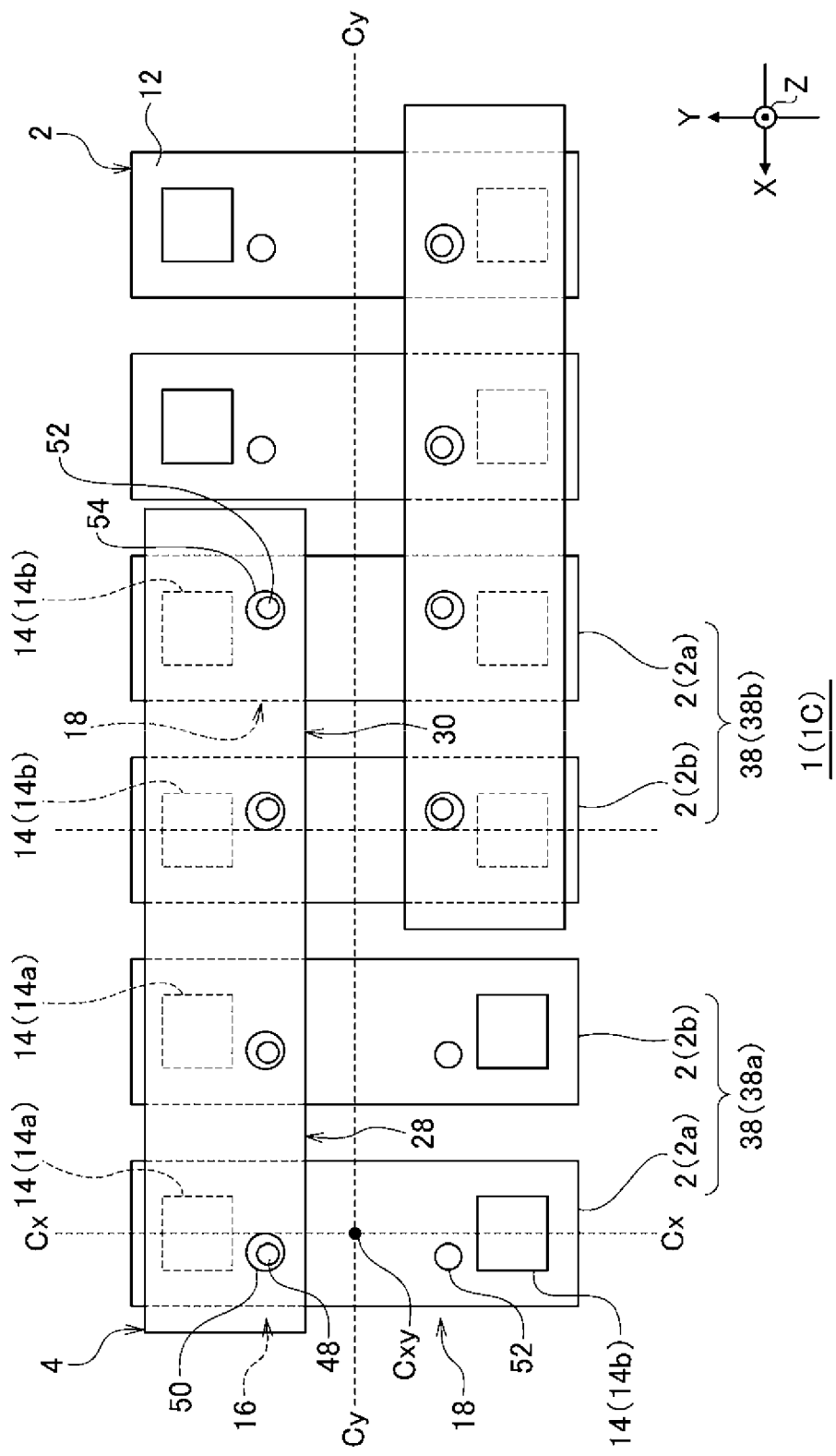
FIG. 7 is a schematic plan view that illustrates part of a battery module according to a third exemplary embodiment.

FIG. 7 is a schematic plan view that illustrates part of a battery module according to the third exemplary embodiment. Battery module 1 (1C) includes a plurality of batteries 2 and a plurality of busbars 4. The plurality of batteries 2 are stacked together at predetermined intervals. Main sides of batteries 2 that are adjacent to each other are in contact with each other. Busbars 4 electrically connect the plurality of batteries 2 that have been stacked together with each other.

Each of the plurality of batteries 2 includes first terminal 14a and second terminal 14b. Each of the plurality of batteries 2 includes battery-side first structure 16 and battery-side second structure 18 that regulate the connection of battery 2 and busbars 4. Battery-side first structure 16, battery-side second structure 18, busbar-side first structure 28, and busbar-side second structure 30 cooperate with each other. Consequently, the connection of each of batteries 2 and busbar 4 is regulated.

In the present exemplary embodiment, battery-side first structure 16 includes first male structure 48 or first female structure 50. First male structure 48 fits in first female structure 48. For example, battery-side first structure 16 includes first male structure 48 in FIG. 7. For example, first male structure 48 is a protrusion that protrudes from sealing sheet 12, and is cylindrical. For example, first male structure 48 is made of a resin that has an insulation property. A height of first male structure 48 is higher than a height of first terminal 14a. First male structure 48 of battery-side first structure 16 is closer to a side of battery 2 than center Cx of battery 2 along axis X along which batteries 2 are stacked together. Further, first male structure 48 is close to first terminal 14a. For example, first male structure 48 is closer to first terminal 14a of battery 2 than center Cy of battery 2 along horizontal axis Y.

Battery-side second structure 18 includes second male structure 52 or second female structure 54. Second male structure 52 fits in second female structure 54. For example, battery-side second structure 18 includes second male structure 52 in FIG. 7. For example, second male structure 52 is a protrusion that protrudes from sealing sheet 12, and is cylindrical, similarly as first male structure 48. For example, second male structure 52 is made of a resin that has an insulation property. A height of second male structure 52 is higher than a height of second terminal 14b. Second male structure 52 of battery-side second structure 18 is closer to a side of battery 2 than center Cx of battery 2 along axis X along which batteries 2 are stacked together. The side of battery 2 is the side to which first male structure 48 is closer than center Cx of battery 2. Further, second male structure 52 is close to second terminal 14b. For example, second male structure 52 is closer to second terminal 14b of battery 2 than center Cy of battery 2 along horizontal axis Y.

A positional relation between first male structure 48 and first terminal 14a is different from a positional relation between second male structure 52 and second terminal 14b. That is to say, if center Cxy of battery 2 along axis X along which batteries 2 are stacked together and along horizontal axis Y is used as a point of rotational symmetry, first male structure 48 and second male structure 52 of battery 2 do not have rotational symmetry.

Each of busbars 4 is elongated and extends along axis X along which batteries 2 are stacked together. Busbar 4 includes busbar-side first structure 28 and busbar-side second structure 30. Busbar-side first structure 28, busbar-side second structure 30, battery-side first structure 16, and battery-side second structure 18 cooperate with each other. Consequently, the connection of each of batteries 2 and busbar 4 is regulated. Busbar-side first structures 28 each include first female structure 50 if battery-side first structures 16 each include first male structure 48. Alternatively, busbar-side first structures 28 each include first male structure 48 if battery-side first structures 16 each include first female structure 50. For example, busbar-side first structures 28 each include first female structure 50 in FIG. 7. First female structure 50 is an opening whose diameter is larger than a diameter of the protrusion of first male structure 48. Positions of first female structures 50 correspond to positions of first male structures 48. That is to say, if orientations of batteries 2 that have been arranged are correct, and busbar 4 is disposed on batteries 2, first male structures 48 are in first female structures 50, respectively, when first male structures 48 and first female structures 50 are seen along vertical axis Z.

Busbar-side second structures 30 each include second female structure 54 if battery-side second structures 18 each include second male structure 52. Alternatively, busbar-side second structures 30 each include second male structure 52 if battery-side second structures 18 each include second female structure 54. For example, busbar-side second structures 30 each include second female structure 54 in FIG. 7. Second female structure 54 is an opening whose diameter is larger than a diameter of the protrusion of second male structure 52, similarly as first female structure 50. Positions of second female structures 54 correspond to positions of second male structures 52. That is to say, if orientations of batteries 2 that have been arranged are correct, and busbar 4 is disposed on batteries 2, second male structures 52 are in second female structures 54, respectively, when second male structures 52 and second female structures 54 are seen along vertical axis Z.

The plurality of batteries 2 are divided into a plurality of battery units 38. Each of the plurality of battery units 38 includes at least two batteries 2. Busbars 4 connect batteries 2 of each of battery units 38 with each other in parallel. Further, busbars 4 connect battery units 38 with each other in series. In an example illustrated in FIG. 7, first battery unit 38a includes first battery 2a and second battery 2b that are stacked together in such a manner that positive terminal 14 of first battery 2a is adjacent to positive terminal 14 of second battery 2b, and negative terminal 14 of first battery 2a is adjacent to negative terminal 14 of second battery 2b. Similarly, second battery unit 38b includes first battery 2a and second battery 2b that are stacked together in such a manner that positive terminal 14 of first battery 2a is adjacent to positive terminal 14 of second battery 2b, and negative terminal 14 of first battery 2a is adjacent to negative terminal 14 of second battery 2b.

First battery unit 38a and second battery unit 38b are stacked together in such a manner that first terminal 14a of first battery unit 38a is adjacent to second terminal 14b of second battery unit 38b. Busbar 4 is joined to first terminals 14a and second terminals 14b. Consequently, busbar 4 connects first battery 2a and second battery 2b of each of battery units 38 with each other in parallel. Further, busbar 4 connects first battery unit 38a with second battery unit 38b in series.

Figure 8A:
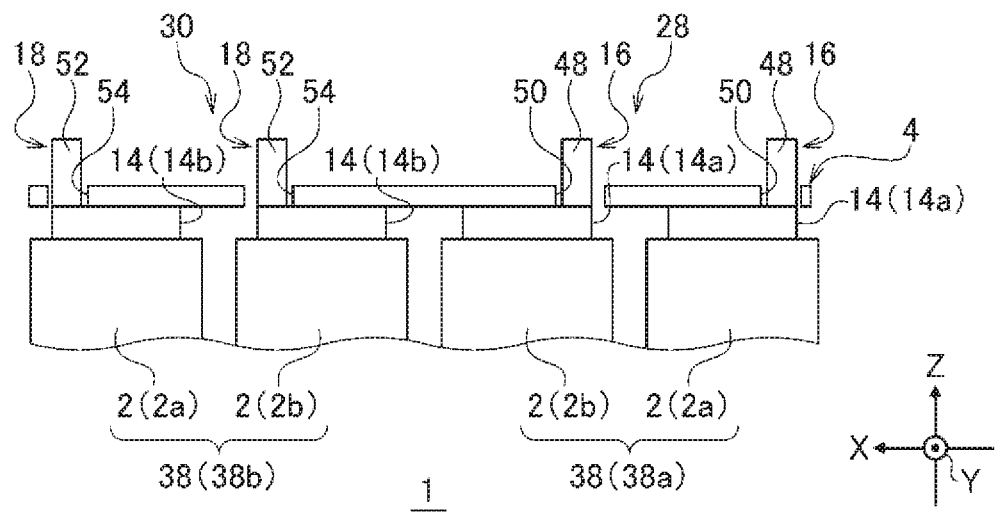
FIG. 8A is a schematic side view that illustrates part of the battery module in which batteries are arranged. Orientations of the batteries are correct.

FIG. 8A is a schematic side view that illustrates part of the battery module in which batteries are arranged. Orientations of the batteries are correct. In an example in FIG. 8A, all batteries 2 that correspond to one busbar 4 are stacked together in such a manner that orientations of first terminals 14a and orientations of second terminals 14b are correct. In that case, battery-side first structures 16 of two batteries 2 are combined with busbar-side first structures 28. Further, battery-side second structures 18 of the other two batteries 2 are combined with busbar-side second structures 30.

First male structures 48 of batteries 2 of first battery unit 38a fit in first female structures 50 of busbar 4, respectively. Further, second male structures 52 of batteries 2 of second battery unit 38b fit in second female structures 54 of busbar 4, respectively. Consequently, busbar 4 is in contact with terminals 14 of batteries 2. That is to say, if first male structures 48 fit in respective first female structures 50, and second male structures 52 fit in respective second female structures 54, busbar 4 is allowed to be connected with all batteries 2. Consequently, batteries 2 and busbar 4 are electrically connected with each other.

Figure 8B:
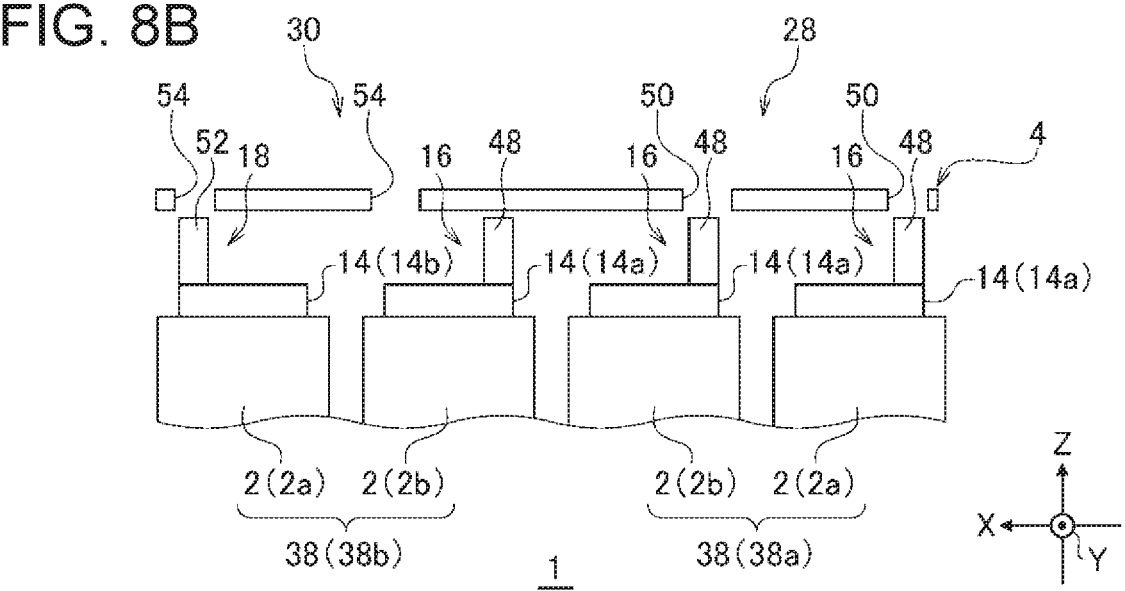
FIG. 8B is a schematic side view that illustrates an example in which an orientation of one of batteries that have been arranged is wrong.

On the other hand, if battery-side first structure 16 of any one of batteries 2 is combined with busbar-side second structure 30, or if battery-side second structure 18 of any one of batteries 2 is combined with busbar-side first structure 28, battery 2 in question or the other batteries 2 are not connected with busbar 4. FIG. 8B is a schematic side view that illustrates an example in which an orientation of one of batteries that have been arranged is wrong.

For example, an orientation of second battery 2b of second battery unit 38b is wrong, as illustrated in FIG. 8B. First terminal 14a and second terminal 14b of second battery 2b are at wrong positions. Orientations of other batteries 2 are correct. In that case, battery-side first structure 16 of second battery 2b of second battery unit 38b is combined with busbar-side second structure 30. Battery-side first structures 16 of batteries 2 of first battery unit 38a are combined with busbar-side first structures 28. Battery-side second structure 18 of first battery 2a of second battery unit 38b is combined with busbar-side second structure 30.

First male structures 48 of battery-side first structures 16 of batteries 2 of first battery unit 38a are in first female structures 50 of busbar-side first structures 28, respectively, when first male structures 48 and first female structures 50 are seen along vertical axis Z. Second male structure 52 of battery-side second structure 18 of first battery 2a of second battery unit 38b are in second female structure 54 of busbar-side second structure 30 when second male structure 52 and second female structure 54 are seen along vertical axis Z. On the other hand, first male structure 48 of battery-side first structure 16 of second battery 2b of second battery unit 38b is not in second female structure 54 of busbar-side second structure 30 when first male structure 48 and second female structure 54 are seen along vertical axis Z. Since first male structure 48 of battery-side first structure 16 of second battery 2b of second battery unit 38b is not in second female structure 54 of busbar-side second structure 30, first male structure 48 does not fit in second female structure 54. Similarly, if battery-side second structure 18 is combined with busbar-side first structure 28, second male structure 52 is not in first female structure 50. Consequently, second male structure 52 does not fit in first female structure 50.

Therefore, first male structure 48 does not allow busbar 4 to be disposed on batteries 2. Therefore, busbar 4 is not in contact with terminals 14 of batteries 2. Consequently, second battery 2b of second battery unit 38b is not connected with busbar 4 since orientations of terminals 14 of second battery 2b of second battery unit 38b are wrong. Other batteries 2 are not either connected with busbar 4.

As described above, battery module 1 according to the present exemplary embodiment includes battery-side first structures 16 each of which includes first male structure 48, and busbar-side first structures 28 each of which includes first female structure 50. Alternatively, battery module 1 according to the present exemplary embodiment includes battery-side first structures 16 each of which includes first female structure 50, and busbar-side first structures 28 each of which includes first male structure 48. First male structure 48 fits in first female structure 50. Further, battery-side second structures 18 each include second male structure 52, and busbar-side second structures 30 each include second female structure 54. Alternatively, battery-side second structures 18 each include second female structure 54, and busbar-side second structures 30 each include second male structure 52. Second male structure 52 fits in second female structure 54. First male structure 48 does not fit in second female structure 54. Further, second male structure 52 does not fit in first female structure 50. If first male structures 48 fit in respective first female structures 50, and second male structures 52 fit in respective second female structures 54, busbar 4 is allowed to be connected with all batteries 2. The configuration does not allow a short circuit to occur between batteries 2 in battery module 1. Further, batteries 2 are not allowed to be wrongly arranged.

Figure 9:
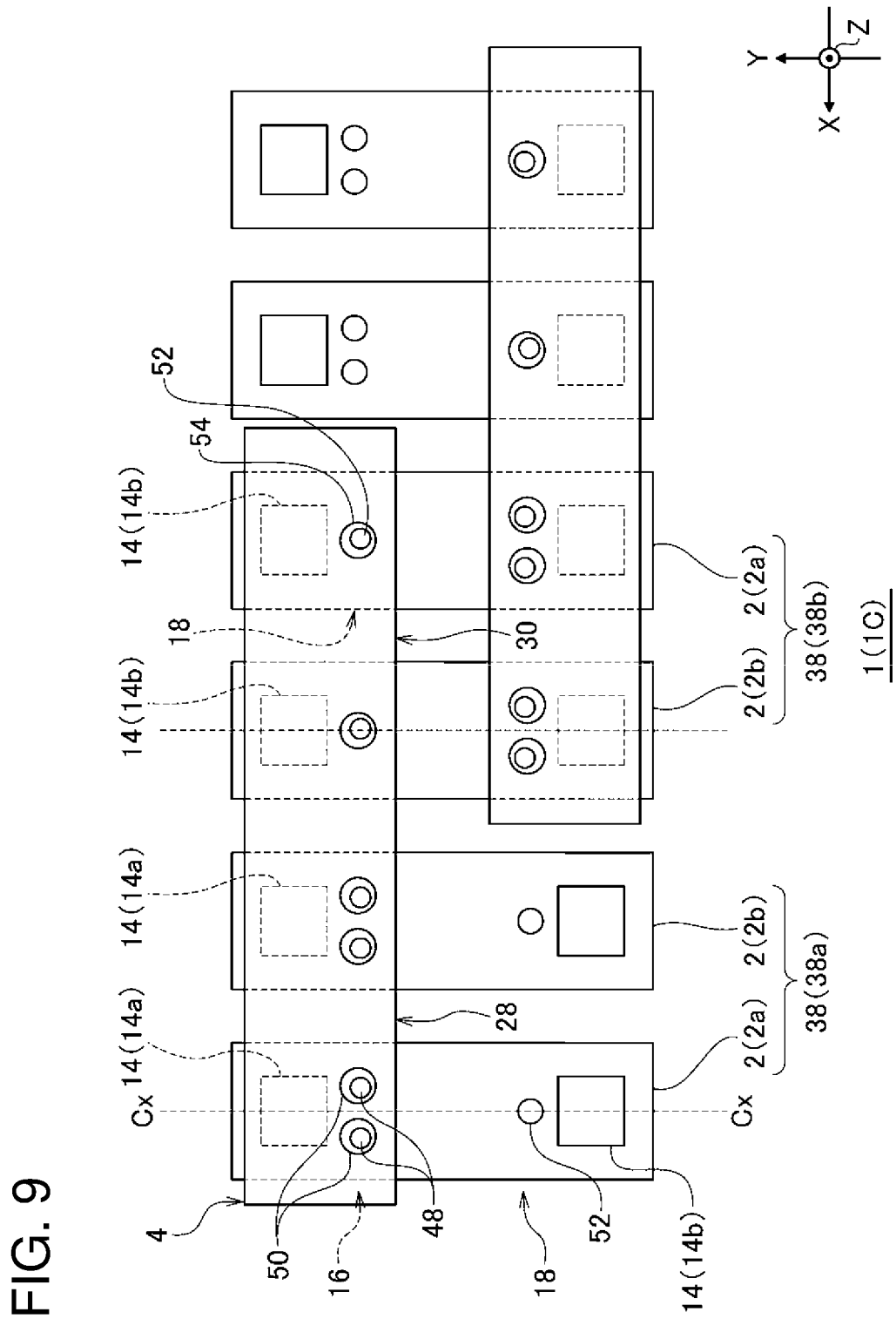
FIG. 9 is a schematic plan view that illustrates part of a battery module according to an example of variations.

Hereinafter, an example of variations on battery module 1 according to the third exemplary embodiment will be described. FIG. 9 is a schematic plan view that illustrates part of a battery module according to the example of variations. In the third exemplary embodiment, a positional relation between a protrusion of first male structure 48 and terminal 14 is different from a positional relation between a protrusion of second male structure 52 and terminal 14. Consequently, first male structure 48 is not allowed to fit in second female structure 54. Further, second male structure 52 is not allowed to fit in first female structure 50. In the present example of variations, a number of protrusions of first male structure 48 is different from a number of protrusions of first female structure 50. Consequently, first male structure 48 is not allowed to fit in second female structure 54. Further, second male structure 52 is not allowed to fit in first female structure 50.

More specifically first male structure 48 includes two protrusions. On the other hand, second male structure 52 includes one protrusion. First female structure 50 includes two openings. The two openings correspond to the two protrusions of first male structure 48. Second female structure 54 includes one opening. The one opening corresponds to the one protrusion of second male structure 52. First male structure 48 and second male structure 52 do not have rotational symmetry, similarly as in third exemplary embodiment. The present example of variations has an effect that is similar to an effect of the third exemplary embodiment.

Further, in the present example of variations, a shape of first male structure 48 has line symmetry. Further, a shape of second male structure 52 has line symmetry. An axis of the line symmetry is a straight line that passes through center Cx of battery 2 and is parallel to axis X along which batteries 2 are stacked together. More specifically, the straight line is between two protrusions of first male structure 48. Further, distances from the straight line to each of the two protrusions are equal. Further, the straight line passes through a center of a protrusion of second male structure 52.

In the third exemplary embodiment, a protrusion of first male structure 48 is apart from center Cx of battery 2 along axis X along which batteries 2 are stacked together. Further, a protrusion of second male structure 52 is apart from center Cx of battery 2 along axis X along which batteries 2 are stacked together. Therefore, if a straight line that passes through center Cx and is parallel to axis X along which batteries 2 are stacked together is used as an axis of line symmetry, first male structure 48 does not have line symmetry. Further, if a straight line that passes through center Cx and is parallel to axis X along which batteries 2 are stacked together is used as an axis of line symmetry, second male structure 52 does not have line symmetry. In that case, positions of first female structures 50 of each of busbars 4 that are arranged in one of two sides that are relative to horizontal axis Y are different from positions of first female structures 50 of each of busbars 4 that are arranged in the other side. Further, positions of second female structures 54 of each of busbars 4 that are arranged in one of two sides that are relative to horizontal axis Y are different from positions of second female structures 54 of each of busbars 4 that are arranged in the other side (see FIG. 7). Therefore, two kinds of busbars 4 are used.

In the present example of variations, first male structure 48 has line symmetry if a straight line that passes through center Cx and is parallel to axis X along which batteries 2 are stacked together is used as an axis of the line symmetry. Further, second male structure 52 has line symmetry if a straight line that passes through center Cx and is parallel to axis X along which batteries 2 are stacked together is used as an axis of the line symmetry. Therefore, positions of first female structures 50 of each of busbars 4 that are arranged in one of two sides that are relative to horizontal axis Y are same as positions of first female structures 50 of each of busbars 4 that are arranged in the other side. Further, positions of second female structures 54 of each of busbars 4 that are arranged in one of two sides that are relative to horizontal axis Y are same as positions of second female structures 54 of each of busbars 4 that are arranged in the other side (see FIG. 9). Therefore, only one kind of busbars 4 is used. Therefore, the present example of variations reduces cost of manufacture of battery module 1.

To allow a shape of first male structure 48 to be different from a shape of first female structure 50, not only different arrangements of protrusions or different numbers of protrusions are used, but also different shapes of protrusions may be used. For example, a protrusion of first male structure 48 has a first shape (is triangular, for example) when the protrusion is seen along vertical axis Z. Further, a protrusion of second male structure 52 has a second shape (is circular, for example) when the protrusion is seen along vertical axis Z. Further, an opening of first female structure 50 has the first shape, and an opening of second female structure 54 has the second shape. Consequently, first male structure 48 is allowed to fit in first female structure 50, and is not allowed to fit in second female structure 54. Further, second male structure 52 is allowed to fit in second female structure 54, and is not allowed to fit in first female structure 50.

In the third exemplary embodiment and example of variations, busbar 4 may include protrusions, and battery 2 may include openings. Further, first female structure 50 and second female structure 54 may each connect with an edge of busbar 4.

The present invention is not limited to the above exemplary embodiments. Some of the exemplary embodiments may be combined together. Alternatively, the exemplary embodiments may be modified based on knowledge of the person of ordinary skill in the art. For example, designs of the exemplary embodiments may be variously modified. If some of the exemplary embodiments are combined together, a resultant exemplary embodiment falls within the scope of the present invention. Further, if the exemplary embodiments are modified, resultant exemplary embodiments also fall within the scope of the present invention. If some of the exemplary embodiments are combined together, a resultant exemplary embodiment has effects of the exemplary embodiments that have been combined together. Further, if the exemplary embodiments are modified, resultant exemplary embodiments each have an additional effect of the modification.

In the above exemplary embodiments, batteries 2 are prismatic batteries. However, a shape of batteries 2 is not particularly limited and may be cylindrical, for example. Further, a total number of batteries 2 of battery module 1 is not particularly limited. A total number of battery units 38 of battery module 1 is not particularly limited. A number of batteries 2 of each of battery units 38 is not particularly limited. Further, exterior cans of batteries 2 may be each covered with an insulating sheet, such as a heat shrink tube.

The invention claimed is:

1. A battery module comprising:
a plurality of batteries stacked together, each of the plurality of batteries includes a first terminal and a second terminal, the first terminal and the second terminal having the same height; and
a busbar that electrically connects the plurality of batteries with each other,
wherein
the first terminal of each of the plurality of batteries are aligned with one another in a first row, and the second terminal of each of plurality of batteries are aligned with one another in a second row,
each of the plurality of batteries includes a battery-side first structure and a battery-side second structure that regulate connection of the battery and the busbar,
the battery-side first structure is an intermediate conductive member disposed between the first terminal and the busbar, the battery-side first structure has a recessed portion which receives the first terminal of a given one of the plurality of batteries, the battery-side first structure providing an electrical connection between the first terminal and the busbar,
the battery-side second structure is an intermediate conductive member disposed between the second terminal and the busbar, the battery-side second structure has a recessed portion which receives the second terminal of the given one of the plurality of batteries, the battery-side second structure providing an electrical connection between the second terminal and the busbar,
the busbar has a busbar-side first structure and a busbar-side second structure that regulate connection of the busbar and each of the batteries, and
wherein if the battery-side first structures of the plurality of batteries are combined with the busbar-side first structure, and the battery-side second structures of the plurality of batteries are combined with the busbar-side second structure, each of the batteries is connected with the busbar, and
if the battery-side first structure of any one of the batteries is combined with the busbar-side second structure, the one of the batteries or another one of the batteries is not connected with the busbar, or if the battery-side second structure of any one of the batteries is combined with the busbar-side first structure, the one of the batteries or another one of the batteries is not connected with the busbar.

2. The battery module according to claim 1, wherein
the first terminal is in contact with the busbar at a contact point of the first terminal,
the battery-side first structure allows the contact point of the first terminal to have a first height,
the second terminal is in contact with the busbar at a contact point of the second terminal,
the battery-side second structure allows the contact point of the second terminal to have a second height,
the busbar-side first structure has a contact point where the busbar is in contact with the first terminal,
the busbar-side second structure has a contact point where the busbar is in contact with the second terminal,
a position of the busbar-side first structure and a position of the busbar-side second structure are apart from each other by a difference along an axis along which the busbar is disposed on the batteries,
the difference is a difference between the first height and the second height, and
the battery-side first structure and the battery-side second structure have different shapes.

3. The battery module according to claim 1, wherein
the first terminal is in contact with the busbar at a contact point of the first terminal,
the battery-side first structure allows a distance from a center of the battery to the contact point of the first terminal to be a first distance,
the distance from the center of the battery to the contact point of the first terminal is along an axis along which the first terminal and the second terminal are arranged,
the second terminal is in contact with the busbar at a contact point of the second terminal,
the battery-side second structure allows a distance from a center of the battery to the contact point of the second terminal to be a second distance, the distance from the center of the battery to the contact point of the second terminal is along the axis, the busbar-side first structure has a contact point where the busbar is in contact with the first terminal, the busbar-side second structure has a contact point where the busbar is in contact with the second terminal, a position of the busbar-side first structure and a position of the busbar-side second structure are different from each other by a difference along the axis, and the difference is a difference between the first distance and the second distance.

4. The battery module according to claim 1, wherein the battery-side first structure includes a first male structure, and the busbar-side first structure includes a first female structure, or the battery-side first structure includes the first female structure, and the busbar-side first structure includes the first male structure, and the first male structure fits in the first female structure, and the battery-side second structure includes a second male structure, and the busbar-side second structure includes a second female structure, or the battery-side second structure includes the second female structure, and the busbar-side second structure includes the second male structure, and the second male structure fits in the second female structure, and the first male structure does not fit in the second female structure, and the second male structure does not fit in the first female structure, and the battery-side first structure and the battery-side second structure have the same shape, and are disposed on the first terminal and second terminal, respectively, so as to have the same orientation.

5. The battery module according to claim 1, wherein the plurality of batteries are divided into a plurality of battery units, each of the plurality of battery units includes at least two of the plurality of batteries, the busbar connects the at least two of the plurality of batteries of each of the battery units with each other in parallel, and the busbar connects the battery units with each other in series.

6. The battery module according to claim 1, wherein the battery-side first structure and the battery-side second structure have different heights.

* * * * *